United States Patent Office 3,332,193
Patented July 25, 1967

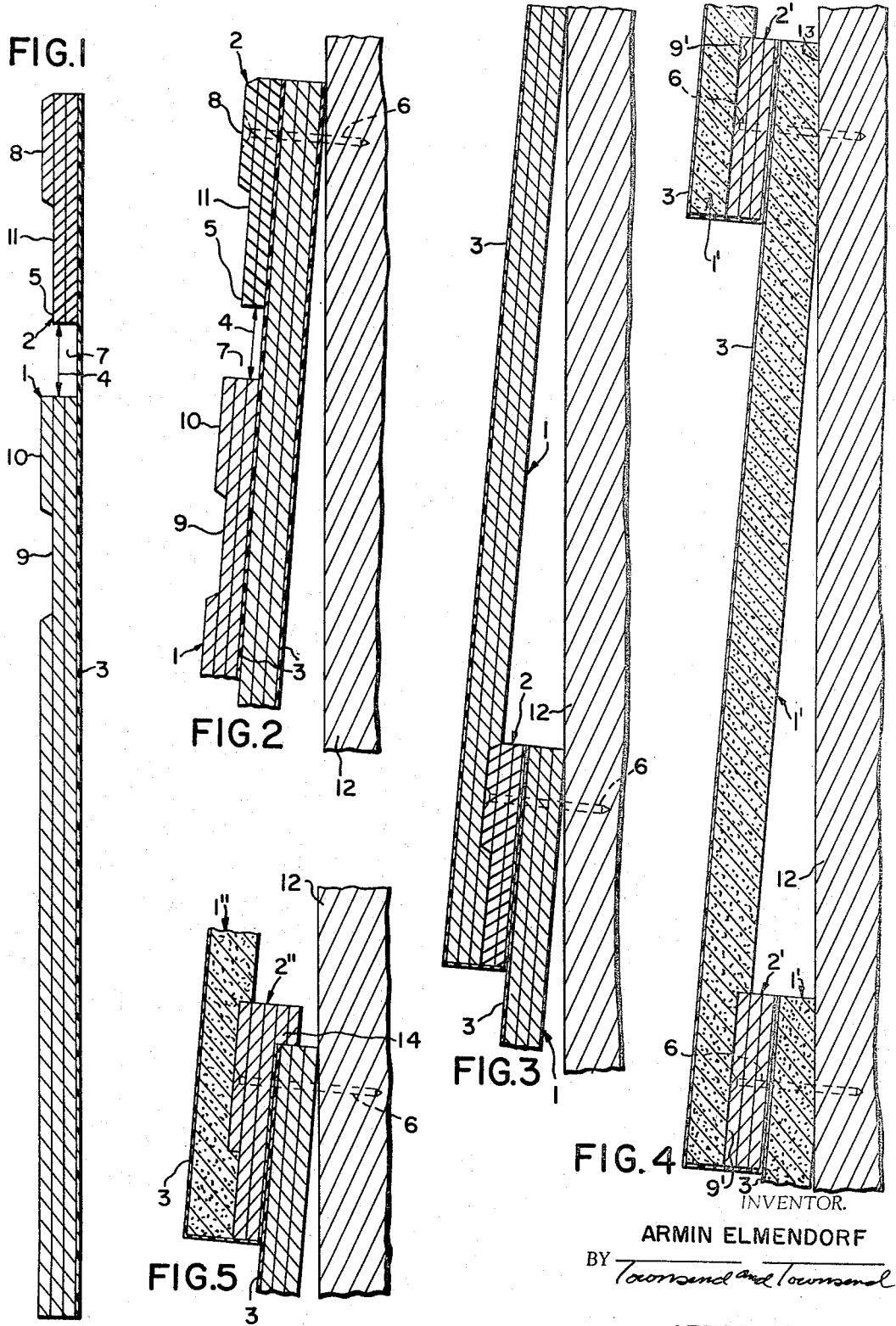

3,332,193
PREFABRICATED PANEL WITH PLIABLE
FILM THEREON
Armin Elmendorf, 860 Charleston Road,
Palo Alto, Calif. 94303
Filed Feb. 1, 1965, Ser. No. 429,468
4 Claims. (Cl. 52—545)

The panel of this invention lies in the field of factory-finished siding products that require only nailing on the job.

Various kinds of base materials are available for walls and roofs in which the panel is finished at the factory. Most products of that type are made of plywood or of ligno-cellulosic fibers either in the form of particle board, hardboard or insulation board, or as a single lamina in the form of lumber.

All ligno-cellulosic products are hygroscopic and are subjected to slight dimensional changes even if well finished. Such changes are caused by prolonged exposure to changes in the ambient atmospheric humidity. The changes in width of lumber are greater than those of all other ligno-cellulosic boards but the changes in length are below those of all other products. The dimensional changes in both length and width of plywood are far less than width changes in lumber but greater than the shrinkage or expansion of lumber lengthwise. The dimensional stability of plywood exceeds that of all fibrous composite boards of the hardboard, particle board, or insulation board type. Plywood shrinks or expands less than all such products; hence it is the preferred product for the base panel of the present invention. But plywood also has its liabilities for outdoor use. It is generally made of rotary-cut veneer and such veneers, especially if made of softwoods such as Douglas fir or pine, tend to check in the weather and to crack the finish.

If plywood is to be finished in the factory it is generally first surfaced with a weather-resistant membrane such as thick paper impregnated with an appropriate thermosetting resin. Such membranes prevent checking but upset the equilibrium of the panel and introduce warping. They are, however, extensively used for surfacing plywood, particle board and low density soft boards of the insulation board type, as a partial solution to the problem. The finish applied to the surface of the facing membrane produces different results from those obtained when the same finish is applied to the edges of the panel when exposed to the weather on account of differences in panel absorption. To apply the resin-impregnated membrane to the edges introduces difficult manufacturing problems.

One of the purposes of the present invention is to eliminate the problem of warping.

Another problem that confronts all manufacturers of ligno-cellulosic siding panels finished in the factory is the problem of fastening. If nails are driven through the face of the panel the finish is thereby punctured and the protection offered by the finish is affected. Various kinds of clips that hold the lower edge of the panel have been developed and so have metal strips formed to fit into grooves in the panel. One method that has found extensive use is to attach a longitudinal strip to the back of the panel and to shape this strip and the upper edge of the panel below it so that they lock together. A conventional method is to bevel the upper edge and the edge of the strip on the back of the panel so that when in position, and the upper edge has been nailed, the lower edge of the next panel cannot pull away. No nails need then be driven through the factory-applied finish, in those areas that are exposed to the weather. The present invention provides for concealed nailing with the nail head buried in the siding. The nails are driven through the upper edge of the panel which then holds the lower edge of the next panel through the medium of an anchoring strip.

Siding panels whose area of coverage on the wall is fixed by an anchoring strip bonded to the back have a disadvantage non-existent in lumber siding. The width of the space covered by such construction is the same for all panels; hence, the carpenter cannot adjust the width so that there will be no narrow siding strips or a gap for the last course. In the case of lumber siding the carpenter can divide the wall height into any number of panel widths desired, as the exposure can be changed to suit. The present invention has as one of its purposes the possibility of adjusting the panel exposure as in lumber siding and without showing the nail as in lumber. By adjusting the exposure there will be no area at the top of the wall uncovered.

Architects and builders have a strong preference for a thick panel edge because it contributes to the impression of strength and solidity. One of the disadvantages of the conventional ⅜-inch plywood siding is that the exposed edge is only ⅜-inch thick. One of the purposes of the present invention is to increase the thickness of the edge of the siding, to make it ⅝-inch for ⅜-inch plywood, and ⅞-inch for ½-inch panels such as insulation board or particle board.

One way to solve the problem of panel warping associated with panels faced with resin impregnated paper and then finished is to replace the combination of impregnated paper plus finish with a thin pliable pigmented synthetic resin film that is highly weather resistant. Several such films are available and in use. Polyvinyl chloride and polyvinyl fluoride films are useful for this purpose. The present invention is carried out by employing such films instead of liquid finishes. In a thickness of about 2 to 10 mils they can be bent to a right angle.

Other objects of the present invention will become apparent upon reading the following specification and referring to the accompanying drawing wherein similar characters of reference represent corresponding parts in each of the several views.

In the drawing:

FIGURE 1 is a vertical sectional view of a siding or roof panel in accordance with this invention;

FIGURE 2 is a vertical sectional view of the panel shown in FIGURE 1 partially positioned in place on a wall;

FIGURE 3 is a vertical sectional view of the panel shown in FIGURE 1 finally positioned in place on a wall;

FIGURE 4 illustrates an alternative construction of the panel in accordance with the present invention; and FIGURE 5 illustrates still another alternative construction of the panel in accordance with this invention.

For a clear understanding of the present invention, reference may be made to the following drawings.

FIGURE 1 shows a section through a siding or roof panel constructed in accordance with the requirements of the present invention in which 1 is the base panel, in this case made of plywood, 2 is a clamping strip, 3 is a pliable, pigmented, and weather-resistant film bonded to the base panel and to the clamping strip, spanning a gap 4 which separates an edge of the base panel from an edge of the clamping strip, the width of this space being equal to the combined width of these edges, 8 is a shoulder projection in the clamping strip that fits into a groove 9 of the base panel, and 10 is a shoulder in the base panel that fits into the recess 11 of the clamping strip.

FIGURE 2 shows a similar plywood panel, which may, however, also be any other ligno-cellulosic panel such as insulation board, particle board, or hardboard, in place after the nails 6 have been driven through the clamping strip 2 and the upper portion of the next lower panel 1 into a nailing base 12.

FIGURE 3 shows the panel 1 of FIGURE 2 raised up and rotated on its film hinge into its final position. The upper edge of the base panel 1, of whatever type, may be chamfered on the back so that it will be parallel to the nailing base 12 as shown at 13 in FIGURE 4. The nailing base may be plywood or lumber sheathing, or furring strips nailed to the framing of the building or any other material which will receive and hold nails.

FIGURE 4 shows a simple construction in which the clamping strip 2' is plywood, the base panel 1' is a fiber board, and the groove 9' for the clamping strip 2' extends to the panel edge.

FIGURE 5 shows a clamping strip 2" provided with an interior shoulder 14 for the builder who prefers the construction in which the position of the panel 1" relative to the next lower panel is fixed.

Each of the constructions illustrated may be further strengthened by applying an adhesive to the clamping strip immediately before rotating the base panel on its film hinge. The tension in the film at the lower edge of the base panel in its final position holds the panel in contact with the clamping strip while the adhesive sets. Such bonding is, however, optional.

The weatherproof film finish may be reinforced if desired with a flexible fabric, or aluminum foil may be used as a backing if both the finish and the foil are thin.

Any type of weather-resistant cold setting adhesive may be used for bonding the base panel to the clamping strip such as urea or resorcinol adhesive. The type of adhesive does not constitute part of the invention.

Staples or screws may be used in place of nails. The fastening means are concealed by the lower portion of the base panel. The type of fastening does not constitute part of the invention.

When the siding panel, the clamping strip, and the nailing base are all made of plywood there is practically no relative motion between them due to dimensional changes resulting from changes in atmospheric humidity, and there is no problem of shrinkage in length. If the components are made of different materials, the ends of the siding may be lapped and caulked. The type of panel end does not constitute part of the invention.

It will now be seen that when the base panel is turned up on its film hinge the thickness at the lower edge of the resultant siding becomes that of the combined edges of the panel and the clamping strip, that the lower edge is protected with the same finish as the face, and that the same nail holds both the lower edge of one panel and the upper edge of the next lower panel without showing the nail head, the nail head being buried within the siding, and, furthermore, that due to the anchorage of the shoulder of the clamping strip in the recess of the panel there can be no slipping of the panel downward during installation thereby revealing the fact that the siding is not one-piece of full edge thickness but is made of two independent members.

Although the foregoing invention has been described in some detail by way of illustration and example for purposes of clarity and understanding, it is understood that certain modifications may be practiced within the spirit of the invention as limited only by the scope of the appended claims.

I claim:

1. A horizontal lap siding for buildings consisting in part of a plywood panel, a plywood clamping strip having a shoulder projection at one end and a recess at the other end thereof, the thickness of said clamping strip at the shoulder being the same as the thickness of the panel, and a pigmented weatherproof pliable film that can be bent to a right angle at ambient outdoor temperatures bonded to the panel and to the clamping strip, with a space between the edge of the panel and the edge of the clamping strip equal to the combined width of the edges, the panel being provided with a shoulder adjacent the edge and a groove having a width equal to the width of the shoulder projection to receive said shoulder projection and prevent transverse relative movement between said panel and said clamping strip when said shoulder projection is positioned within said groove.

2. A construction for the sides and roofs of buildings comprising a plurality of courses, each of said courses including a panel, a clamping strip, a weatherproof pliable film secured to the panel and the clamping strip, the film being bent to a right angle at an edge of the clamping strip and at an edge of the panel, and being clamped between the clamping strip and the upper portion of the next course, said panel and said clamping strip defining a longitudinally extending shoulder projection and a mating longitudinally extending groove to prevent transverse relative movement between said panel and said strip when said shoulder projection is positioned within said groove, a nailing base, and fastening means securing the clamping strip to the base, the fastening means being concealed by the lower portion of the panel.

3. A construction for the sides and roofs of buildings comprising a plurality of courses, each of said courses including a ligno-cellulosic panel, a ligno-cellulosic clamping strip, and a weatherproof pliable film bonded to the panel and to the clamping strip, the film being bent to a right angle at an edge of the clamping strip and at an edge of the panel and being clamped between the clamping strip and the face of the upper portion of the next course, said panel and said clamping strip defining a longitudinally extending shoulder projection and a mating longitudinally extending groove to prevent transverse relative movement between said panel and said strip when said shoulder projection is positioned within said groove, a nailing base, mechanical fastening means driven through the clamping strip and the upper edge of another panel into the nailing base, the fastening means being concealed by the lower portion of said ligno-cellulosic panel.

4. A building member for exposure to the weather comprising a panel member, a clamping strip member, and a weatherproof pliable film that can be bent to a right angle at ambient outdoor temperatures secured to the panel and to the clamping strip members, with a space between the edge of the panel member and the edge of the clamping strip member equal to the combined width of these edges, said panel and said clamping strip members having a longitudinally extending shoulder projection on one of said members and a mating longitudinally extending groove on the other of said members to prevent transverse relative movement between said panel and said strip members when said shoulder projection is positioned within said groove.

References Cited

UNITED STATES PATENTS

| 1,994,643 | 3/1935 | Harshberger | 52—528 |
| 2,032,083 | 2/1936 | Dudleston | 52—545 |
| 2,192,810 | 3/1940 | Angier | 52—545 |
| 2,402,731 | 6/1946 | Clements | 52—545 |
| 3,228,164 | 1/1966 | Ettore | 52—309 X |

FRANK L. ABBOTT, *Primary Examiner.*

M. O. WARNECKE, *Assistant Examiner.*